Figure 1:
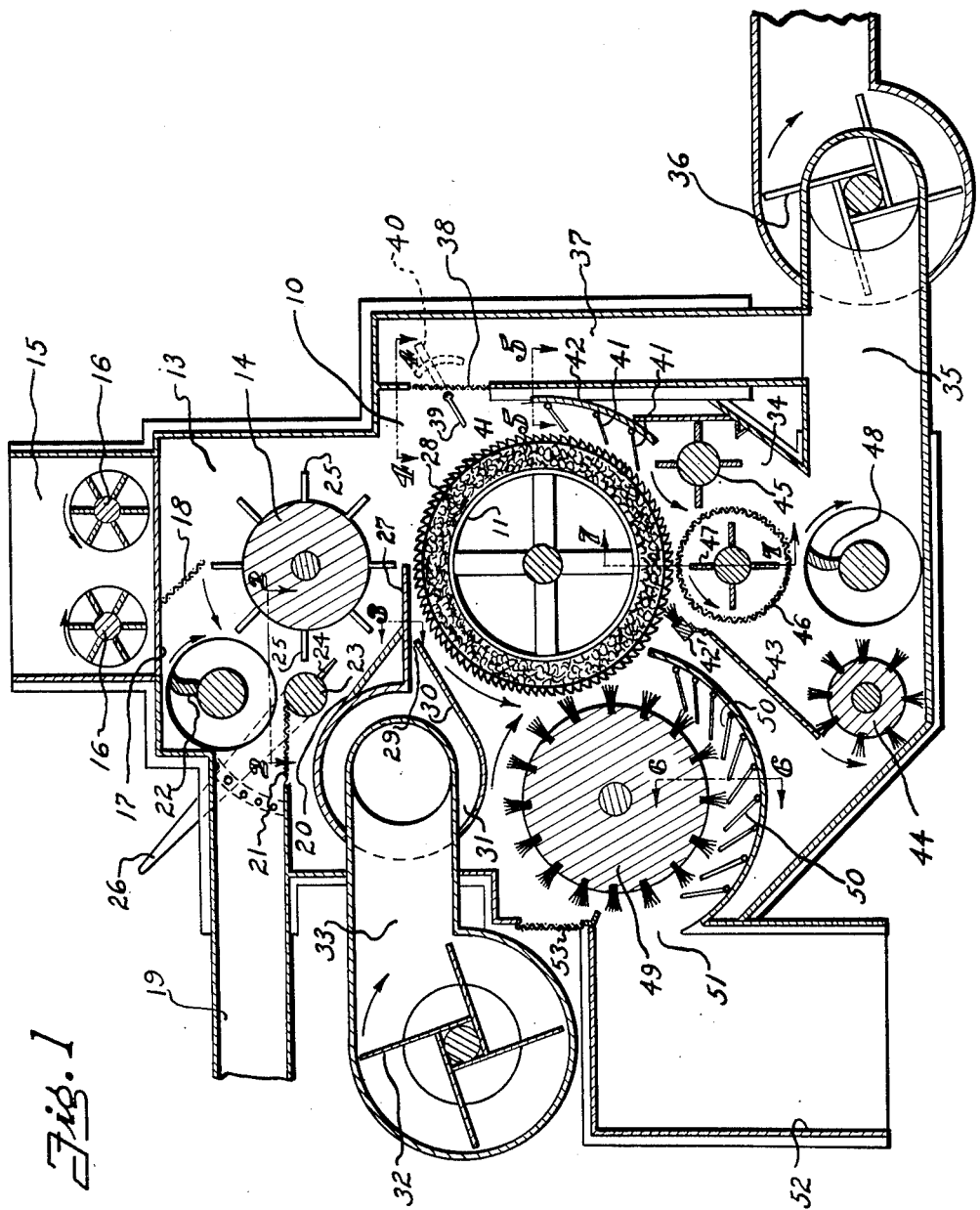

May 26, 1953 A. T. MOSELEY 2,639,467
BUR EXTRACTOR FOR UNGINNED OR SEED COTTON
Filed Jan. 10, 1949 2 Sheets-Sheet 1

INVENTOR.
Alexander T Moseley
Ahley & Ahley
Attorneys

May 26, 1953            A. T. MOSELEY            2,639,467
BUR EXTRACTOR FOR UNGINNED OR SEED COTTON
Filed Jan. 10, 1949            2 Sheets-Sheet 2
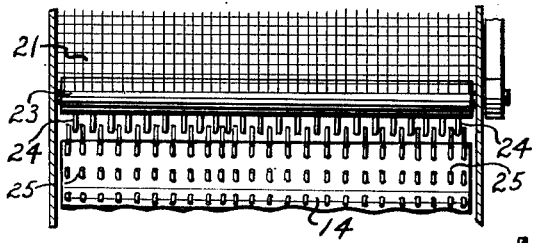
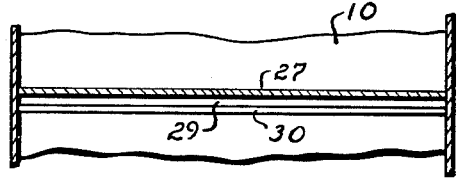
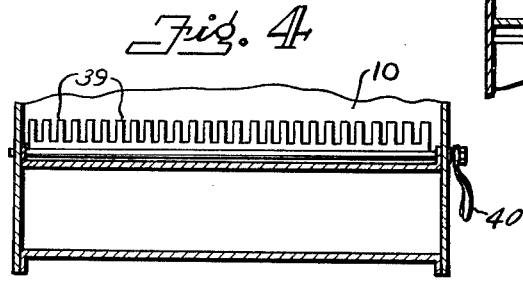
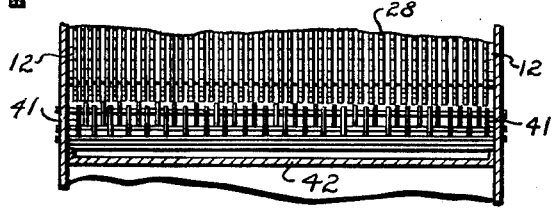
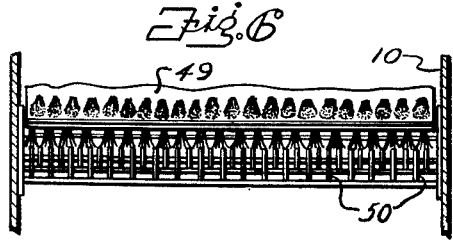
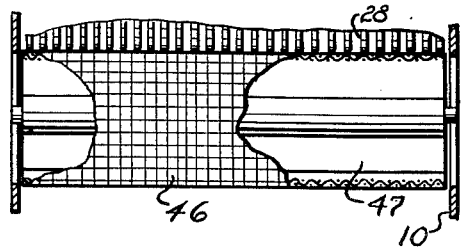
INVENTOR.
Alexander T. Moseley
Ahley & Ahley
Attorneys Patented May 26, 1953

2,639,467

UNITED STATES PATENT OFFICE 2,639,467

BUR EXTRACTOR FOR UNGINNED OR SEED COTTON

Alexander T. Moseley, Dallas, Tex.

Application January 10, 1949, Serial No. 70,038

18 Claims. (Cl. 19—38)

This invention relates to new and useful improvements in bur extractors for unginned or seed cotton.

One object of the invention is to provide an improved bur extractor for seed cotton which employs a stream of air, either blast or suction or both, in combination with a saw cylinder or carding cloth cylinder or carding cloth belt, or other similar device for the separation of bur and foreign matter from the seed cotton.

Another object of the invention is to provide an improved bur extractor for seed cotton and the like in which numerous and repeated separating steps are carried out in order to separate thoroughly the bur from the seed cotton.

A still further object of the invention is to provide an improved bur extractor for cotton in which the cotton and burs are drawn directly into the extractor by an air stream in place of delivery from an outside air separator as is now customarily employed.

A particular object of the invention is to provide an improved bur extractor for seed cotton and the like in which an initial separation of the burs and the cotton is made by means of a saw or other similar structure, and in which the cotton passing through the machine along with the separated burs is reclaimed by collection upon a screen cylinder from which the burs are removed and which passes in close proximity to the saw cylinder or other similar elements whereby such cotton is reclaimed by being picked up by the saw cylinder and again passed through the separating steps.

A pertinent object of the invention is to provide an improved bur extractor for seed cotton and the like in which air currents are used to a considerable extent for separating the burs from the cotton, and in which said air currents are controlled by the employing of both blast and suction fans forming a part of the machine.

A construction designed to carry out the invention will be hereinafter described together with other features of the invention.

The invention will be more readily understood from a reading of the following specification and by reference to the accompanying drawing, wherein an example of the invention is shown, and wherein:

Fig. 1 is a schematic, transverse, vertical, sectional view of a bur extractor constructed in accordance with this invention, and Figs. 2 through 7 are longitudinal sectional views taken along the planes indicated by the respective lines of Fig. 1.

In the drawings, the numeral 10 designates a hollow, generally rectangular roll box within which a suitable toothed cylinder, saw cylinder, carding cloth cylinder, or other similar device 11 is disposed for rotation. The cylinder 11 carries suitable gaskets or packing material 12 at each end (Fig. 5) to provide an air seal between the ends of said cylinder and the end walls of the roll box 10.

Above the roll box is positioned a feed box 13 within which a spiked cylinder or drum 14 is horizontally disposed for rotation, the axis of the drum 14 being parallel to and substantially vertically aligned with the axis of the cylinder 11. A feed chute 15 enters the upper end of the feed box 13 and carries a pair of contrarotating feed rollers 16 of the usual variety. A closure plate 17 is adapted to be positioned transversely of the chute 15 when the latter is not used for cotton feeding, and closes off the chute to prevent the entry of air therethrough. A suitable screen surface 18 projects downwardly at an angle from the bottom side of the plate 17 toward the right hand side of the feed box 13 and has its lower edge disposed substantially in vertical alignment with the axis of the spiked roller 14. Thus, cotton and burs being fed into the box 13 between the rollers 16, are allowed to fall onto the spiked roller when the plate 17 is removed, or the chute may be closed off by replacement of said plate. The cotton will be fed to the rolls 16 by gravity, and will fall onto the spiked drum 14 by gravity and by means of air suction to be described hereinafter.

An air suction inlet duct 19 extends into the left hand side of the box 13 in a horizontal plane with its horizontal center substantially tangentially disposed with respect to the drum 14, and has its lower wall merging into a downwardly inclined chute plate 20 which extends from the left hand portion of the box 13 to a point adjacent to the upper portion of the saw cylinder 11. A foraminous or screen surface 21 extends horizontally into the feed box 13 from the upper end of the chute plate 20 and has its inner edge spaced a short distance from the left hand portion of the periphery of the spiked drum 14. A spreader conveyor 22 is disposed horizontally within the upper left hand portion of the box 13 between the inlet duct 19 and the screen 18, and overlies the inner edge of the screen surface 21. The conveyor 22 is thus positioned in the mouth of the inlet duct 19 and substantially closes the same. With this alternative inlet, the incoming cotton may be fed directly into the machine through the duct 19 by means of an air blast or air suction, and will be received by the conveyor 22 and spread uniformly over the width of the feeder box 13 so as to pass onto the spiked drum 14 in a substantially uniform bat or layer. The screen 21 permits the air to pass unhindered from the inlet duct 19, and largely separates the air from the cotton and causes the cotton to be fed gently into the spreading conveyor 22. At the same time, the screen 18 prevents cotton passing over the top of the drum 14.

A breaker bar 23 is positioned immediately below the inward edge of the screen surface 21 and carries a plurality of laterally extending breaker fingers 24 adapted to mesh with the fingers 25 of the spiked drum 14. An adjustable lever 26 is mounted upon one end of the bar 23 to permit swinging of the fingers 24 in a vertical arc whereby their clearance with respect to the fingers 25 may be adjusted.

Whether the incoming cotton is fed in through the chute 15 or duct 19, it will be picked up by air currents and by the drum 14 which rotates in a counterclockwise direction, and forced to pass over the breaker fingers 24 of the bar 23. The meshing of the fingers 25 and the fingers 24 will result in breaking of the burrs and bolls as they pass through this space, and the cotton will be placed in ideal condition for further separation of the foreign matter therefrom. In drawing the cotton in by air, the air passes both over and under the spiked drum. The cotton is stopped by the inclined screen 18 above the drum and falls on the drum.

As shown in Fig. 1, the outer extremities of the fingers 25 of the drum 14 pass in an arc contiguous to the periphery of the saw cylinder 11 at the upper side or surface of said cylinder. A doffer or stripper blade 27 is positioned horizontally within the extractor and extends from the left hand upper portion of the roll box 10 to a point substantially in vertical alignment with the axes of the saw cylinder and the drum 14. The inner edge of the knife 27 is thus positioned between the drum 14 and the saw cylinder at their point of closest approach. The inclined chute plate 20 merges into the upper surface of the blade 27 approximately at its medial portion, and the cotton which has passed between the breaker fingers 24 and 25 is thus caused to flow onto the upper surface of the blade 27 and is moved by means of air currents and by the rotation of the drum 14 to the inner edge of said knife. The saw cylinder 11 rotates in a counterclockwise direction and has its teeth 28 facing in this direction. Therefore, as the cotton passes over the inner edge of the knife 27, it is picked up in small tufts by the teeth 28 and moved beneath the knife 27 and to the left, as viewed in Fig. 1. The inner edge of the knife thus serves as a doffer or stripper and holds back or removes the burs and bolls, and other trash, which may be present among the cotton fibers. However, the major portion of the separation of the trash at this point takes place by means of an air blast and suction passing beneath the blade 27 and to the right as viewed in Fig. 1, the air blast flowing from a nozzle 29 formed by the left hand portion of the blade 27 and a plate 30 which projects upwardly at an angle from beneath the blade 27. The plate 30 underlies the left hand portion of the knife 27 and has its upper right hand edge positioned adjacent the underside of the medial portion of said knife blade. This close positioning of the edge of the plate to the knife forms the nozzle 29. An air chamber 31 merges into the left hand edges of the knife 27 and the plate 30, and is supplied with air under pressure from a suitable fan 32 which is connected to the chamber 31 through a duct 33. The fan thus causes an air blast to flow through the nozzle 29 and in a thin sheet over the underside of the knife 27 and above the upper surface of the saw cylinder 11. The tufts of cotton which have been picked by the saw teeth 28 are securley held thereby and may pass through this air blast as the saw cylinder rotates in a counterclockwise direction. However, the trash, burs and bolls which may be present in the cotton being fed into the machine, are not securely held by the saw teeth, and are blown by the blast of air from the surface of the saw cylinder and into the upper right hand portion of the roll box 10.

It is to be noted that the bat or layer of cotton being fed into the roll box by the drum 14 is not immediately disposed of by being picked up by the saw cylinder 28 as soon as it passes over the edge of the knife 27. The blast of air from the fan 32, and also a suction air current to be described hereinafter, will tend to move the cotton to the right while the saw cylinder tends to move it to the left, and the mass of cotton will thus form into an elongate roll disposed within the upper right hand portion of the roll box and lying tangential to the upper right hand portion of the saw cylinder 11. As the roll rotates, the teeth 28 pick up the tufts of cotton as explained hereinbefore, and it is at this point that the stripper knife 27 achieves its most efficacious action and at which the blast of air from the fan 32 augmented by a suction of air performs a major portion of its dirt and trash separating function.

The cotton is thus continuously being fed into the roll which has been formed in the roll box and is being removed therefrom by the saw cylinder 11 with the trash being constantly rejected by the blade 27 and the blasts of air from the fan 32, and suction of air whereby the accumulated trash is left free to pass downwardly over the right hand side or surface of the saw cylinder.

A hopper 34 is formed in the bottom of the roll box 10, and a suction air duct 35 is connected thereinto. A suitable suction fan 36 causes a stream of air of considerable magnitude to be drawn through the duct 35, and thus places a suction upon the hopper and upon the lower portion of the roll box 10. An auxiliary duct 37 runs from the duct 35 to the upper right hand wall of the roll box and communicates with the interior of the roll box through a vertical screen and opening 38 positioned in the right hand wall of the box near its upper end. As shown in Fig. 1, the screened opening 38 is adjacent the roll of cotton which accumulates above and to the right of the saw cylinder 11, and with this structure means is provided for removing considerable quantities of the fine dirt and trash which may be present in the cotton. This dirt is drawn through the screened opening 38 and the duct 37, and exhausted through the duct 35 and the fan 36. The opening 38 also permits an air suction to be directed upon the roll of cotton in the upper portion of the roll box to augment the blast of air coming from the nozzle 29. This latter is probably the more important function of the screened opening 38.

The trash or foreign matter and the small amount of cotton which remains within the roll box falls upon a pivoted finger board 39 which is positioned inwardly of the screened opening 38 and may be adjusted through a suitable lever 40. The finger board 39 projects downwardly at an angle toward the saw cylinder and thus directs the trash and cotton onto the surface of said cylinder. At this point, some additional cotton will be picked up by the teeth 28 of the saw cylinder while the trash and burs will pass onwardly due to the two currents of air set up by the fans 32 and 36.

It is well to point out at this juncture the effect given by the use of both a pressure or blast fan and a suction fan. The tendency of air currents is to flow as directly as possible from an inlet to a suction fan, and thus the fan 36 will have a tendency to draw a current of air in close proximity to the periphery of the saw cylinder from the points of air inlet, namely the duct 19 and the nozzle 29. This current of air set up by the fan 36 will hug the surface of the saw cylinder, and if it were used by itself would tend to pull the material being cleaned and separated too closely into the saw cylinder.

The blast of air flowing through the nozzle 29 from the fan 32 has just the opposite effect and tends to travel in a straight line tangential to the upper surface of the saw cylinder. This current of air tends to move away from the periphery of the saw cylinder rather than toward it, and if used alone, would result in a withholding of the cotton from the teeth 28 of the saw cylinder so that said cotton could not be picked up thereby. However, by using both fans, each extreme may be avoided and the cotton and trash caused to flow in a uniform fashion downwardly between the right hand portion or surface of the saw cylinder and the right hand wall of the roll box 10. The cotton is given an ample opportunity to be picked up by the teeth of the saw cylinder, but the trash is not forcefully held in contact with the cylinder by reason of the air currents created. These air currents follow the contour of the saw cylinder but do not press closely thereagainst. Either air blast or air suction may be used alone, but from the foregoing it is obvious that the best results are obtained when the two are used together.

With this air system, the entire space between the right hand wall of the roll box 10 and the saw cylinder is filled with a swirling mass of trash and cotton, and as the cotton comes into contact with the saw cylinder, it is picked up by the teeth 28 and held thereby against subsequent dislodgement by the air currents which are flowing. However, the trash and burs are repeatedly blown from the saw cylinder and pass on downwardly through the machine.

A plurality of sets of needles or spikes 41 are positioned adjacent the right hand side of the saw cylinder 11, these needles extending in horizontal rows across the machine parallel to the saw cylinder, and being directed downwardly at an angle toward the surface of said cylinder. With this structure, as the mass of trash and cotton passes downwardly through the machine, it is repeatedly directed toward the surface of the saw cylinder whereby the cotton may be picked up by the teeth 28 while the trash is blown onwardly by means of the air currents which have been created. For the purpose of emphasizing this directing toward the surface of the saw cylinder, the needles or spikes 41 are preferably mounted upon an arcuate supporting plate 42 which extends in a substantially vertical fashion adjacent the inner surface of the right hand wall of the box 10 and gradually curves inwardly toward the underside of the saw cylinder. The arcuate path of the trash and cotton around the saw cylinder is thus maintained without the mass of material being urged into too close engagement with said cylinder.

For the purpose of segregating the right and left hand sides of the hopper bottom 34 of the roll box 10, a sealing brush 42' engages the lower surface of the saw cylinder at a point slightly to the left of the vertical axis of said cylinder and carries a hinged depending plate 43 which projects downwardly to the left at an angle and rests upon the upper surface of a rotating cylindrical brush 44 with suitable sealing material at each end. The brush 44 is mounted for rotation about a horizontal axis at the bottom of the hopper 34 and to the left thereof, as shown in Fig. 1. The brush forms an air seal and prevents the passage of air between the left and right portions of the hopper bottom, and at the same time, because of its counterclockwise rotation, will convey dirt and trash from said left hand portion of the hopper bottom to the right hand portion thereof. The downwardly flowing air currents are thus restricted to the right hand portion of the hopper bottom 34.

The mass of burs and trash, and whatever cotton may remain, pass downwardly from the fingers 41 over a fan type raker 45 and onto the surface of a cylindrical screen drum 46 positioned immediately beneath the saw cylinder 11. The screened cylinder or drum 46 is mounted for rotation about a horizontal axis parallel to and in vertical alignment with the axis of the saw cylinder and its pheriphery passes into close proximity to the saw teeth 28 at the bottom of said saw cylinder. An internal fan 47 is provided within the cylinder 46 and functions to draw air into the cylinder and exhaust it from the under side thereof. Thus, the cotton and trash are drawn onto the surface of the screen cylinder 46, and as the same rotates in a counterclockwise direction, moves into the very small space between the upper side of said cylinder and the lower side of the saw cylinder. At this point, the remaining cotton is picked up by the saw teeth 28 and carried upwardly thereby, while the trash and burs accumulate in a roll disposed to the right of the juncture between the screened drum 46 and the saw cylinder 11. The fan type raker 45 engages this trash as it accumulates, and by reason of its counterclockwise rotation throws said trash downwardly into the lower portion of the hopper bottom 34. At the same time, the action of the blades of the raker moving downwardly adjacent the upwardly moving blades of the fan 47 partially exhausts air from between the latter blades just before they come into the path of the downwardly moving stream of cotton and foreign matter. In this manner, the suction effect through the screened drum 46 is achieved and exhausting outwardly through the bottom portion of the drum 46 is maintained.

From the bottom of the hopper, the fine trash will be withdrawn through the duct 35, while the heavy trash is moved outwardly along the bottom of the hopper by the usual type of screw conveyor 48.

The cotton reclaiming structure constituted by the screen drum 46 and the fan type raker 45 represent an extremely important feature of this invention, and it is obvious that this structure may well be employed with many types of cotton cleaning and processing equipment. It functions as a last and final means for recovering the ultimate percentage of cotton and for minimizing the quantity of such cotton that is lost with the trash which has been removed.

The cotton which is picked up by the teeth 28 of the saw cylinder 11 has had substantially all of the foreign matter removed therefrom, and certainly all large particles of trash such as burs, bolls, and the like, have been removed by the repeated subjection of the mass of material to the air currents passing through the machine and by the stripping action of the blade 27. The cotton is carried by the teeth 28 to the left hand side of the saw cylinder and there is removed by the usual type of doffing brush 49 which is mounted for rotation about a horizontal axis parallel to the axis of the saw cylinder and to the left thereof as viewed in Fig. 1. The surface of the doffing brush rotates in engagement with the periphery of the saw cylinder and at a higher peripheral speed whereby the cotton is wiped from the saw teeth 28 and carried along with the doffing brush in the course of its rotation. It is desirable to clean the cotton slightly further at this point and to remove any fine material which may yet remain therein. For this purpose, a plurality of horizontal rows of picker fingers or needles 50 are arranged in an arc beneath the doffing brush and projecting upwardly at an angle with respect thereto. These fingers have their upper ends barely clearing the periphery of the brush and repeatedly agitate and beat the cotton as it is carried thereover by said brush. With this structure, the fine particles of dirt and trash are knocked and beaten loose and are thrown outwardly and downwardly by the brush into the left hand portion of the hopper bottom 34. As the trash falls into the bottom of this portion it is picked up by the sealing brush 44 and moved into the right hand portion of the hopper bottom, from which it is withdrawn by the conveyor 48 or the fan 36. The cotton passes onwardly with the brush 49 and is thrown outwardly therefrom at the left hand wall of the roll box 10, the cotton passing through an opening 51 into a cotton discharge chute 52. Prior to reaching the opening 51, the cotton is held upon the brush 49 by means of the fingers 50 which comb and beat the cotton in its peripheral passage to remove the dirt therefrom. A screened opening 53 is provided in the left hand wall of the roll box 10 immediately above the opening 51 so that a suction of air may flow inwardly through the opening 53 to fan 36 and augment the blast of air passing between the stripper knife 27 and the saw cylinder 11.

If desirable, either or both of the sets of fingers 41 and 50 may be made adjustable to increase or decrease their clearance with respect to the saw cylinder 11 and the doffing brush 49, so that the cleaning and beating action of said teeth or fingers may be regulated to the desired degree. This characteristic extends throughout the machine, all of the various drums, brushes and cylinders being adjustable upon their axes to regulate their clearance with respect to or spacing from the various other elements of the machine.

The apparatus may arbitrarily be divided into a cleaning section which includes the saw cylinder, the nozzle 29, the suction screen 38, the cleaning fingers 41 and 50, and the doffing brush 49. The cotton reclaiming portion of the device, as previously recited, includes the screen cylinder 46 and the fan type raker 45. Either portion may be used alone, but it is obvious that the optimum results are obtained when both are used in conjunction so that the utmost in the cleaning of the cotton is achieved with little or no loss of cotton with the removed trash.

The uncleaned cotton may be fed inwardly, as previously pointed out, between the feed rollers 16 so as to pass over the screen 18 onto the spiked cylinder or drum 14. In this case, the cotton is spread into a fairly uniform bat by the action of the feed rollers and is carried over the top of the drum 14 into proximity with the spreader conveyor 22 which further spreads the cotton into a more uniform bat before it is acted upon by the intermeshing of the fingers 24 and 25.

In a similar fashion, cotton fed in through the duct 19 is screened over the foraminous surface 21 and spread into a uniform bat by the conveyor 22 from which it passes into engagement with the fingers 24 between which the fingers 25 rotate. The chief advantage in using the duct 19 is that cotton may be picked up by suction directly from a vehicle or from storage and carried without delay into this bur extracting machine without requiring additional storage or handling or extensive conveying through ducts, screw conveyors, and the like. After the cotton has reached the fingers 24, it is handled in the same manner throughout the balance of the machine regardless of whether it was introduced from the duct 19 or the chute 15.

The operation of the machine has been given along with the description and does not appear to need further explanation at this point. It is to be kept in mind that the air pressures exerted are created by means of the fans 32 and 36 which may be regulated in the usual fashion by speed regulation or damper regulation so as to effect the proper flow of air current into the machine and around the saw cylinder 11, and to provide for the proper neutralization of the undesirable effects of each type of air current. The fans are thus balanced against one another to control the pass of the air and at the same time insure an adequate and full flow of air for cleaning purposes. It is obvious that the incoming air may be heated if desired to effect partial or complete drying at the same time that the cotton is being cleaned.

It is to be noted that most of the air entering through the inlet duct 19 and the nozzle 29 is removed through the screened opening 38 and through the finger board 39 and that the roll of cotton and trash which accumulates in the upper right hand portion of the roll box 10 presses against the saw cylinder, against the finger board 39, and against the screened opening 38. In the event the cotton and trash accumulates to a greater extent than desirable in this portion of the machine, the partial or complete blocking of the screen opening 38 and the finger board 39 by such cotton will reduce the air force tending to urge cotton to this space and the feed to the saw cylinder will thus automatically be regulated and controlled in accordance with the capacity of said saw cylinder to handle the cotton on hand. The screened opening 38 and the finger board 39, by their positioning, thus function in a regulatory fashion to control the feed to the saw cylinder.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a system for cleaning unginned cotton, the steps of, feeding the cotton in a layer into a roll form, passing a cylindrical toothed surface across the roll form of cotton to pick up tufts of cotton, directing a blast of air substantially tangential to the cylindrical toothed surface and counter to its direction of movement over the tufts of cotton held thereby to remove foreign matter from the cotton and the toothed surface, applying a suction air current circumferentially of the cylindrical toothed surface counter to its direction of movement and transversely of the air blast to draw said blast toward the periphery of the surface to counteract the tendency of said blast to depart tangentially from the surface, passing the foreign matter through the suction air current to draw the former circumferentially of the cylindrical toothed surface, and doffing the tufts of cotton from the toothed surface.

2. In a system for cleaning unginned cotton, the steps of, feeding the cotton in a layer into a roll form, passing a cylindrical toothed surface across the roll form of cotton to pick up tufts of cotton, the direction of movement of the cylindrical toothed surface being counter to the direction of feed of the layer of cotton into the roll form, directing a blast of air substantially tangential to the cylindrical toothed surface and counter to its direction of movement over the tufts of cotton held thereby to remove foreign matter from the cotton and the toothed surface, applying a suction air current circumferentially of the cylindrical toothed surface counter to its direction of movement and transversely of the air blast to draw said blast toward the periphery of the surface to counteract the tendency of said blast to depart tangentially from the surface, passing the foreign matter through the suction air current to draw the former circumferentially of the cylindrical toothed surface, and doffing the tufts of cotton from the toothed surface.

3. In a system as set forth in claim 1, the step of repeatedly directing the foreign matter into engagement with the toothed surface to recover cotton from said foreign matter.

4. In a system as set forth in claim 1, the steps of, collecting the cotton from the foreign matter upon a foraminous surface after the foreign matter has passed circumferentially of the cylindrical toothed surface, raking the foreign matter from the foraminous surface, and conveying the cotton upon the foraminous surface to the cylindrical toothed surface.

5. A bur extractor including, a housing, a toothed cylinder in the housing, means for conveying cotton in a layer into the housing above the cylinder, an air nozzle directed substantially tangential to the cylinder at a point in vertical alinement with the point of discharge of the layer of cotton into the housing above the cylinder, an air pump for directing a stream of air through the nozzle, a doffing brush engaging the cylinder, and a cotton flue leading from the doffing brush.

6. As a sub-combination with a toothed cylinder in a cotton cleaner, a foraminous cylinder having its axis parallel to the axis of the toothed cylinder and its periphery contiguous to the periphery of the toothed cylinder, means for drawing air through the surface of the foraminous cylinder, and a stripping cylindrical raker mounted with its axis parallel to the axis of the foraminous cylinder and its periphery contiguous to the periphery of the foraminous cylinder, the foraminous cylinder receiving foreign matter and cotton and passing the cotton to the toothed cylinder while the foreign matter is struck off the foraminous cylinder by the raker.

7. A bur extractor including, a housing, a rotatable toothed cylinder in the housing, means for conveying cotton in a layer into a roll form resting on the cylinder whereby the cylinder may pick up tufts of cotton from the roll, an air nozzle directed substantially tangential to the cylinder opposite to the direction of rotation of the cylinder at a point displaced from the roll of cotton in the direction of rotation of the cylinder, an air pump for directing a stream of air through the nozzle over the tufts of cotton carried by the cylinder to remove foreign matter therefrom, a doffing brush for doffing cotton from the cylinder after it has passed the nozzle, and a stripper blade spaced from the toothed cylinder and overlying the nozzle in close proximity to the periphery of the toothed cylinder, whereby the stream of air flowing from the air nozzle passes between the stripper blade and the periphery of the toothed cylinder.

8. A bur extractor as set forth in claim 7, and a plurality of beater fingers arranged circumferentially of the doffing brush between the point of doffing and the point of cotton discharge from the doffing brush, said fingers extending at an angle toward the periphery of said brush.

9. A bur extractor including, a housing, a rotatable toothed cylinder in the housing, means for conveying cotton in a layer into a roll form resting on the cylinder whereby the cylinder may pick up tufts of cotton from the roll, an air nozzle directed substantially tangential to the cylinder opposite to the direction of rotation of the cylinder at a point displaced from the roll of cotton in the direction of rotation of the cylinder, an air pump for directing a stream of air through the nozzle over the tufts of cotton carried by the cylinder to remove foreign matter therefrom, a doffing brush for doffing cotton from the cylinder after it has passed the nozzle, an air seal between the toothed cylinder and the bottom of the housing, said seal dividing the housing into a right hand and a left hand portion, the doffing brush being disposed in the left hand portion, and a suction fan connected to the right hand portion to draw the foreign matter removed by the air blast around the toothed cylinder counter to the direction of movement of said cylinder.

10. A bur extractor including, a housing, a rotatable toothed cylinder in the housing, means for conveying cotton in a layer into a roll form resting on the cylinder whereby the cylinder may pick up tufts of cotton from the roll, an air nozzle directed substantially tangential to the cylinder opposite to the direction of rotation of the cylinder at a point displaced from the roll of cotton in the direction of rotation of the cylinder, an air pump for directing a stream of air through the nozzle over the tufts of cotton carried by the cylinder to remove foreign matter therefrom, a doffing brush for doffing cotton from the cylinder after it has passed the nozzle, a foraminous cylinder beneath and adjacent to the toothed cylinder for receiving the foreign matter and the cotton therein, means for drawing air through the foraminous cylinder, and a raker for removing foreign matter from the surface of the foraminous cylinder.

11. A bur extractor including, a housing, a rotatable toothed cylinder in the housing, means for conveying cotton in a layer into a roll form resting on the cylinder whereby the cylinder may pick up tufts of cotton from the roll, an air nozzle directed substantially tangential to the cylinder opposite to the direction of rotation of the cylinder at a point displaced from the roll of cotton in the direction of rotation of the cylinder, an air pump for directing a stream of air through the nozzle over the tufts of cotton carried by the cylinder to remove foreign matter therefrom, a doffing brush for doffing cotton from the cylinder after it has passed the nozzle, a suction fan, an auxiliary air suction duct leading from the suction fan to the housing adjacent the roll form of cotton on the side of the roll form away from the air nozzle, and a foraminous sheet extending across the auxiliary duct at the housing walls.

12. A bur extractor including, a housing, a rotatable toothed cylinder in the housing, means for conveying cotton in a layer into a roll form resting on the cylinder whereby the cylinder may pick up tufts of cotton from the roll, an air nozzle directed substantially tangential to the cylinder opposite to the direction of rotation of the cylinder at a point displaced from the roll of cotton in the direction of rotation of the cylinder, an air pump for directing a stream of air through the nozzle over the tufts of cotton carried by the cylinder to remove foreign matter therefrom, a doffing brush for doffing cotton from the cylinder after it has passed the nozzle, and a plurality of cotton guide fingers arranged circumferentially of the toothed cylinder in a zone displaced circumferentially of the cylinder from the roll of cotton in a direction opposite to the direction of rotation of the cylinder in the housing, said fingers extending at an angle toward the periphery of said cylinder.

13. A bur extractor including, a housing, a toothed cylinder in the housing, means for delivering cotton to the cylinder, an air nozzle directing a stream of air tangential to the cylinder, a fan supplying air to the nozzle, and a suction fan connected to the housing at a point remote from the point of tangency between the air stream from the nozzle and the cylinder, said fan drawing air from the housing in a path extending circumferentially of the cylinder and transverse to the stream of air from the air nozzle at a point beyond the point of tangency of said stream of air to the cylinder.

14. A bur extractor including, a housing, a toothed cylinder in the housing, means for delivering cotton to the upper portion of the cylinder, a stripper blade extending longitudinally of the cylinder and overlying and being spaced therefrom, an air nozzle directing a stream of air substantially tangential to the cylinder between the latter and the stripper blade, a fan supplying air to the nozzle, and a doffing brush for doffing cotton from the cylinder after it has passed the nozzle.

15. A bur extractor including, a housing, a rotatable toothed cylinder in the housing, means for conveying cotton into a space contiguous to the cylinder wherein the cylinder may pick up tufts of cotton, an air nozzle directed substantially tangential to the cylinder opposite to the direction of rotation of the cylinder at a point displaced from the aforesaid space in the direction of rotation of the cylinder, said nozzle being adapted to direct a stream of air over the tufts of cotton carried by the cylinder to remove foreign matter therefrom, a doffer for doffing cotton from the cylinder after it has passed the nozzle, and a fixed bur stripper blade parallel to and spaced from the surface of the toothed cylinder and lying contiguous to the stream of air flowing from the air nozzle, whereby the stream of air passes between the bur stripper blade and the surface of the toothed cylinder.

16. A bur extractor including, a housing, a rotatable toothed cylinder in the housing, a feed roller spaced from the toothed cylinder and feeding cotton into a space contiguous to the cylinder wherein the cylinder my pick up tufts of cotton, a bur stripper blade extending between the feed roller and the toothed cylinder parallel to and spaced from said roller and said cylinder, said blade having a stripper edge adjacent the surface of the cylinder, an air nozzle directed substantially tangential to the cylinder opposite to the direction of rotation of the cylinder at a point displaced in the direction of rotation of the cylinder from the stripper edge of the stripper blade, said nozzle being adapted to direct a stream of air over the tufts of cotton carried by the cylinder to remove foreign matter therefrom, a doffer for doffing cotton from the cylinder after it has passed the nozzle, said air nozzle being directed between the cylinder and the bur stripper blade.

17. A bur extractor as set forth in claim 16, wherein the stripper edge of the stripper blade is disposed substantially at the point of closest approach of the peripheries of the feed roller and the toothed cylinder.

18. A bur extractor including, a housing, a rotatable toothed cylinder in the housing, a bur stripper blade directed substantially opposite to the direction of rotation of the toothed cylinder, said blade extending parallel to the axis of the toothed cylinder and having a stripper edge disposed adjacent the surface of said cylinder, means for feeding cotton over the outer face of the blade into a space contiguous to the cylinder wherein the cylinder may pick up tufts of cotton, an air nozzle directed substantially tangential to the cylinder opposite to the direction of rotation of the cylinder at a point displaced in the direction of rotation of the cylinder from the stripper edge of the stripper blade, said nozzle being adapted to direct a stream of air over the inner face of the blade and over the tufts of cotton carried by the cylinder to remove foreign matter therefrom, and a doffer for doffing cotton from the cylinder after it has passed the nozzle, the cotton being fed over the outer face of the bur stripper blade picking up the foreign matter removed by the stripper edge of said blade as the tufts of cotton are passed thereunder, and removing said foreign matter from proximity with said stripper edge.

ALEXANDER T. MOSELEY.

References Cited in the file of this patent

UNITED STATES PATENTS

| Number | Name | Date |
|---|---|---|
| 277,417 | Forshag | May 8, 1883 |
| 743,814 | Boyd | Nov. 10, 1903 |
| 1,022,259 | Phelps | Apr. 2, 1912 |
| 1,099,299 | Hopper | June 9, 1914 |
| 1,222,523 | Cary | Apr. 10, 1917 |
| 1,936,748 | Benjamin | Nov. 28, 1933 |
| 2,024,469 | Mitchell | Dec. 17, 1935 |
| 2,325,183 | Hopper | July 27, 1943 |